United States Patent [19]

Wertz et al.

[11] Patent Number: 4,808,055

[45] Date of Patent: Feb. 28, 1989

[54] TURBINE BLADE WITH RESTORED TIP

[75] Inventors: Timothy A. Wertz, Manahawkin; Gilbert A. Saltzman, Howell; Ira L. Friedman, Rumson, all of N.J.

[73] Assignee: Metallurgical Industries, Inc., Tinton Falls, N.J.

[21] Appl. No.: 38,851

[22] Filed: Apr. 15, 1987

[51] Int. Cl.[4] .................... F01D 5/14; B23P 15/02
[52] U.S. Cl. .................... 416/224; 415/174; 29/156.8 B; 29/402.16; 416/241 R
[58] Field of Search ............. 416/213 R, 213 A, 224, 416/228 R, 241 R, 241 B; 415/9, 172 A, 174; 29/156.8 B, 402.09, 402.13, 402.16, 402.18

[56] References Cited

U.S. PATENT DOCUMENTS

| | | | |
|---|---|---|---|
| 3,199,836 | 8/1965 | Moyer | 415/174 X |
| 4,028,788 | 6/1977 | Demusis | 29/156.8 B |
| 4,033,792 | 7/1977 | Giamei et al. | 416/241 R X |
| 4,050,133 | 9/1977 | Cretella et al. | 416/241 R X |
| 4,176,433 | 12/1979 | Lee et al. | 29/156.8 B |
| 4,214,355 | 7/1980 | Zelahy | 416/213 R X |
| 4,227,703 | 10/1980 | Stalker et al. | 277/53 |
| 4,326,833 | 4/1982 | Zelahy et al. | 416/224 X |
| 4,386,112 | 5/1983 | Eaton | 427/34 |
| 4,390,320 | 6/1983 | Eiswerth | 415/174 X |
| 4,671,735 | 6/1987 | Rossmann et al. | 415/174 X |

FOREIGN PATENT DOCUMENTS

| | | |
|---|---|---|
| 0166676 | 1/1986 | European Pat. Off. . |
| 507428 | 4/1976 | U.S.S.R. .................... 29/156.8 B |

*Primary Examiner*—Robert E. Garrett
*Assistant Examiner*—Joseph M. Pitko
*Attorney, Agent, or Firm*—Kenyon & Kenyon

[57] ABSTRACT

The worn tip of a turbine blade is restored by applying a metallurgically bonded wear resistant surface at the tip. The wear resistant surface is applied using a transferred plasma arc and powdered metal particles.

13 Claims, 1 Drawing Sheet

TURBINE BLADE WITH RESTORED TIP

This invention relates to a turbine blade having a restored tip. More particularly, this invention relates to a gas turbine engine blade having a rebuilt blade tip.

As is known, turbine blades have been constructed in various manners, shapes and sizes for varied uses, such as in engines for jet aircraft, for power plants, pumps and the like. For example, in the case of aircraft engines, it has been known to cast a turbine blade as a single crystal in order to eliminate grain boundary-related failure mechanisms, the primary mode of high temperature failures.

During use, turbine blades are generally subjected to wear at the tips for various reasons. Thus, over time, the blades require refurbishment or replacement. However, in the case of single crystal blades, these blades have simply been replaced as any attempts to rebuild the blade tips have usually not been successful. This has been due to the fact that the heat stresses which would usually be imposed upon the blade tips in order to provide a rebuilt surface have produced weakened areas which may subject the blade to damage or total loss during subsequent use.

In many cases, aircraft turbine blades are made with rather thin cross-sections so that the tips are relatively narrow. Further, the blades are usually of a curved shape. Hence, it becomes rather difficult to form a wear surface on the tip of such a blade. In the past, it has been known to use a plasma spray technique to coat the thin tip of a blade to form a built up thickness of material and to subsequently grind down the applied material to properly size the blade. However, this technique usually results in a relatively thin coating which is subject to chipping. In other cases, it has been known to press and sinter a component into a cap which can then be brazed onto the tip of a blade. However, this technique requires a pressure vessel and imparts a weakness at the brazed seam. Further, these techniques generally require relatively large heat input into the tips of the blade so that unwanted stress conditions arise in the blade tip, and cracking or distortion may occur. In cases where safety is a primary concern, such as in aircraft, rather than restore the blade tips which have been worn, the blades are simply scrapped and new blades are substituted.

Accordingly, it is an object of the invention to provide a turbine engine blade with a wear surface on the tip without the introduction of thermally induced stresses or defects in the blade tip.

It is another object of the invention to restore a turbine blade tip without introducing unwanted stresses in the blade.

It is another object of the invention to provide a relatively simple technique for forming a wear surface on a blade tip.

Briefly, the invention provides a turbine engine blade tip with a metallurgically bonded wear resistant surface.

The wear resistant surface may be formed of a metal alloy or of a metal alloy with added abrasive particles of hard material distributed throughout, so as to form a composite with the metal alloy serving as a matrix for the hard particulate dispersoid. For example, where used, the abrasive particles may be selected from the group consisting of ceramics and refractory metal carbides, nitrides, or borides. Further, these particles may be relatively coarse, in a size range of about 0.020 inches to 0.030 inches, or may be much finer in size, down to about 0.001 to 0.002 inches.

Generally, the blade is formed of a directionally solidified crystal structure and is of curved shape with the tip also being of a curvilinear shape. Further, the blade and the blade tip are relatively thin, for example being in a range of from 0.010 inches to 0.200 inches with the wear resistant surface having a depth or thickness of from about 0.010 inches to 0.120 inches.

As described in U.S. Pat. No. 4,689,463, it is difficult to obtain a weld bead deposit when a workpiece has a relatively narrow edge. However, by employing a process as described in the patent, a wear surface can be formed on the thin blade tip without significant melting of the blade tip or use of elaborate chilling devices.

These and other objects of the invention will become more apparent from the following detailed description taken in conjunction with the accompanying drawing wherein.

Figure 1:
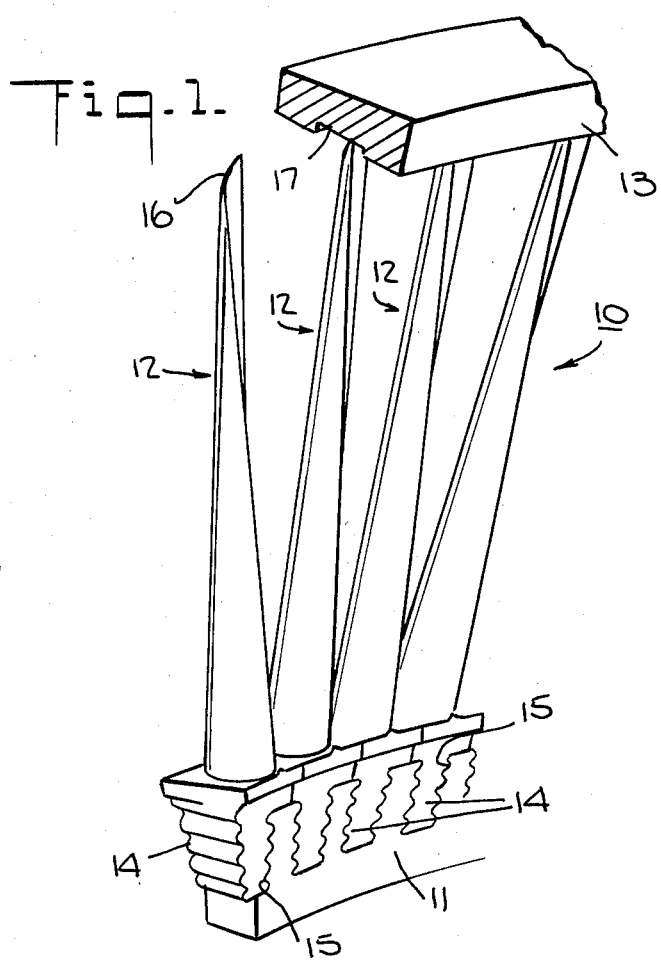
FIG. 1 illustrates a perspective view of a part of a turbine rotor assembly.

Referring to FIG. 1, the turbine rotor assembly 10 includes an inner mounting ring 11, a plurality of turbine blades 12 and an outer seal ring 13. All of these components are of conventional structure and need not be described in detail. As indicated, each blade 12 has a root 14 having a conventional fir tree shape seated in a suitable groove 15 of the mounting ring 11. Each blade 12 is also curvilinear in shape and has a curved tip 16.

Figure 2:
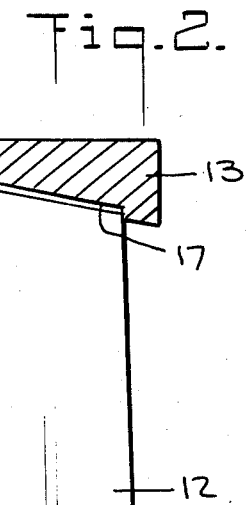
FIG. 2 illustrates a side view of one blade of the rotor assembly of FIG. 1.

As indicated in FIG. 2, the outer seal ring 13 has a groove 17 in which the blade tips 16 move during rotation of the mounting ring 11.

Figure 3:
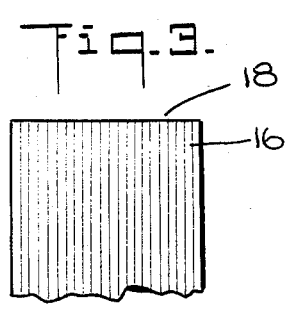
FIG. 3 illustrates a side view of a blade tip of a turbine blade prior to wear.

As indicated in FIG. 3, each blade tip 16 is generally formed with a flat smooth surface 18 and each blade 12 may be formed as a single crystal. Since the techniques for forming such blades are conventional, no further description is required.

Figure 4:
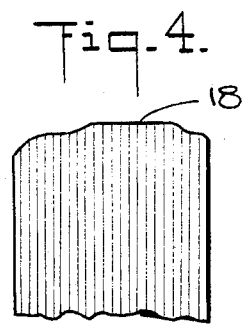
FIG. 4 illustrates a view similar to FIG. 3 of a worn blade tip.
Figure 6:
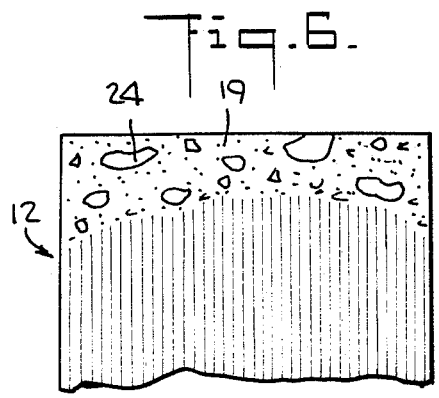
FIG. 6 illustrates a schematic cross-sectional view of a restored blade tip in accordance with the invention.

During use, the blade tips 16 are subject to wear. In an exaggerated case, as shown in FIG. 4, a blade tip may be worn to such an extent that the normally flat surface 18 becomes jagged. In such cases, replacement of the blade becomes necessary.

Figure 5:
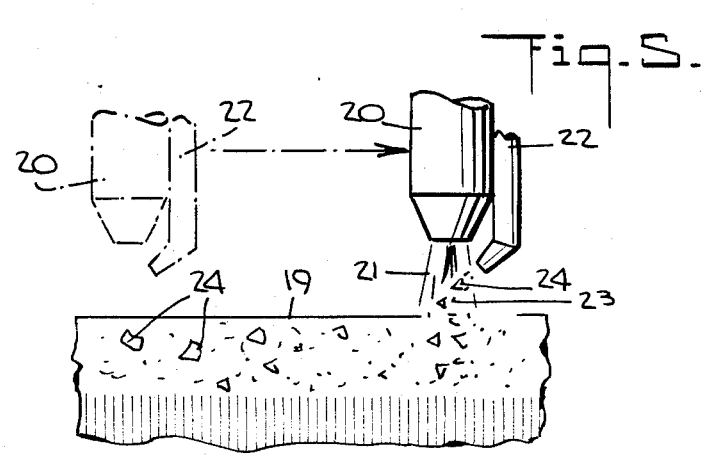
FIG. 5 illustrates a partial view of a blade tip being restored in accordance with the invention.

Referring to FIG. 5, should a blade tip 16 become worn, for example to the extent indicating in FIG. 4, the tip may be restored utilizing the techniques as described in U.S. Pat. No. 4,689,463. To this end, a wear resistant surface made from powdered metal is metallurgically bonded onto the worn blade tip 16.

By way of example, in order to restore the blade tip a plasma torch 20 is positioned opposite the worn tip in order to create a transferred plasma arc 21 between the electrode (not shown) of the torch 20 and the blade tip 16. In addition, a suitable powdered metal feed tube 22 is provided to feed powdered metal particles 23 into the arc 21 for depositing on the blade tip 16. The torch 20 and powdered metal feed tube 22 are shown in side-by-side relation; however, this is intended to be merely schematic since various types of torches and arrangements may be used including that which is specifically described in the copending application.

During operation of the torch 20, for example, a series of overlapping weld deposits are formed along the narrow surface of the blade 16. As indicated, the weld deposit forms the wear surface 19 and is characterized as being a cast metal alloy metallurgically bonded to the blade proper.

In order to enhance the wear characteristics of the wear resistant surface 19, abrasive particles 24 of hard material can be incorporated in the powdered metal particles 23. In such cases, the wear resistant surface forms a composite with the metal alloy serving as a matrix for the abrasive particles 24 distributed throughout, for example, in a ratio of from 10% to 80% by weight.

By way of example, the following parameters are given for a turbine blade having a restored tip in accordance with the invention.

| | |
|---|---|
| Arc Current (peak) | 8 amps |
| Pulse Peak Time (seconds) | 0.10 |
| Arc Current (background) | 3 amps |
| Pulse Background Time (seconds) | 0.10 |
| Arc Voltage (peak) | 27.5 volts |
| Travel Speed | 3 inches/minute |
| Powder Feed Rate | 4.5 grams/minute |

During the wear surfacing process, the blade 12 may be chilled in order to remove heat. In particular, the temperature gradient should decrease rapidly from the surface on which the powdered metal is being cast to a short distance away from the surface, for example approximately one quarter inch. To this end, chill blocks may be used to hold the blade 12 up to the exposed part of the tip 16.

The invention provides a restored turbine blade having a structure substantially equivalent to that of an originally manufactured blade. Thus, instead of scrapping worn blades, the blades can be rebuilt and returned for use.

Since the process of applying the wear surface 19 requires a minimum of heat, the base meterial of the blade 12 is subjected to a similar minimum of stress and distortion. Further, there is a minimum of mixing of the base material with the applied powdered metal and, correspondingly, a minimum of dilution by the base material, and a minimum of penetration of the base material. Thus, the applied wear resistant surface can be of a different material from the base material of the blade.

Of note, depending on the thickness of a blade tip and the degree of wear, the wear resistant surface may be applied using a pulsed plasma transferred arc as described in U.S. Pat. No. 4,689,463 or a non-pulsed plasma transferred arc where the amperage is relatively low, for example in a range of about 1 amps to 15 amps.

The thickness of the applied wear surface 19 may vary depending on the amount of wear of a blade tip from a nominal size of blade. Generally, the thickness of the wear surface 19 will be in a range of from about 0.030 inches to 0.100 inches.

The torch which is used to apply the wear surface 19 may be moved relative to the blade 12 in order to deposit the wear surface and may be moved over the tip 16 for more than one pass, for example where each pass lays down a thickness of 0.030 inches of material. Also, the torch may be oscillated to adapt to the width of the blade tip. Conversely, the blade tip may be moved with a suitable work holder relative to a stationary torch. Additionally, both the torch and the blade tip may be moved in a coordinated motion.

The powdered metal material used to form the wear surface on a blade tip should be compatible with the material of the blade proper. For example where the blade is made of a nickel-base superalloy, the wear resistant surface may be formed of a similar nickel-base superalloy, or wear resistant nickel-base alloy.

The invention provides a restored blade tip which retains the strength of the blade proper. Further, the invention provides a technique of providing a single crystal turbine blade or a multi-crystal blade with a metallurgically bonded wear surface at the tip without thermally shocking the blade tip.

What is claimed is:

1. A turbine engine blade comprising
   a blade root;
   a blade extending from said blade root to a blade tip; and
   a metallurgically bonded wear resistant surface entirely made from powdered metal on said blade tip.

2. A turbine blade as set forth in claim 1 wherein said wear resistant surface is a composite of a metal alloy defining a matrix and abrasive particles of hard material distributed throughout said matrix.

3. A turbine blade as set forth in claim 2 wherein said particles are selected from the group consisting of ceramics and refractory metal carbides, nitrides and borides.

4. A turbine blade as set forth in claim 1 wherein said blade is formed of a single crystal structure.

5. A turbine blade as set forth in claim 1 wherein said wear surface is of a thickness of from 0.010 inches to 0.120 inches.

6. A turbine blade as set forth in claim 5 wherein said particles are in a range of size of about 0.001 inches to 0.030 inches.

7. A turbine blade as set forth in claim 1 wherein said blade is formed of a directionally solidified crystal structure.

8. A restored turbine engine blade comprising
   a blade root;
   a curved blade extending from said blade root to a blade tip; and
   a metallurgically bonded wear resistant surface entirely made from powdered metal on said tip of a thickness in a range of from 0.010 inches to 0.120 inches.

9. A restored turbine blade as set forth in claim 8 wherein said wear resistant surface is of a thickness in a range of from 0.010 inches to 0.100 inches.

10. A restored turbine blade as set forth in claim 8 wherein said blade is made of a nickel-base alloy and said wear resistant surface is characterized in being a cast metal alloy.

11. A restored turbine blade as set forth in claim 10 wherein said wear resistant surface has abrasive particles therein in a ratio of from 10% to 80% by weight of said cast metal alloy.

12. A method of rebuilding a blade tip of a turbine engine blade said method comprising the steps of
   creating a transferred plasma arc between an electrode and a worn tip of the turbine blade at an amperage of from 1 amp to 15 amps; and
   feeding powdered metal particles into the arc for depositing a series of overlapping weld deposits on the blade tip to form a wear resistant layer thereon, said layer being metallurgically bonded to the tip.

13. A method as set forth in claim 12 wherein the wear resistant layer is of a thickness of from 0.010 to 0.120 inches.

* * * * *

UNITED STATES PATENT AND TRADEMARK OFFICE
CERTIFICATE OF CORRECTION

PATENT NO. : 4,808,055

DATED : February 28, 1989

INVENTOR(S) : Timothy A. Wertz, et al

It is certified that error appears in the above-identified patent and that said Letters Patent is hereby corrected as shown below:

Column 3, line 2 change "the copending application" to -U.S. Pat. No. 4,689,463-

Signed and Sealed this

Eighth Day of August, 1989

Attest:

DONALD J. QUIGG

Attesting Officer

Commissioner of Patents and Trademarks